No. 727,626. Patented May 12, 1903.

UNITED STATES PATENT OFFICE.

JOHN D. HAWKINS AND HERBERT W. FOX, OF COLORADO SPRINGS, COLORADO.

PROCESS OF CHLORINATING AND BROMINATING ORES.

SPECIFICATION forming part of Letters Patent No. 727,626, dated May 12, 1903.

Application filed September 29, 1902. Serial No. 125,317. (No specimens.)

*To all whom it may concern:*

Be it known that we, JOHN D. HAWKINS and HERBERT W. FOX, citizens of the United States, and residents of Colorado Springs, county of El Paso, and State of Colorado, have invented a new and useful Process of Chlorinating and Brominating Ores, of which the following is a specification.

In the treatment of ores of gold and silver it is common to pulverize the ore, mix it with water, and subject the pulp to the action of free chlorin, either in gaseous form or in aqueous solution, in order to convert the precious metals into chlorids and enable them to be recovered. The chlorin, which is applied to the pulp while contained either in open vessels or large revolving barrels, is usually obtained from bleaching-powder by the action of dilute acid.

The present improvement consists in supplying chlorin to ores in the form of chlorin hydrate. This hydrate, the chemical composition of which is $Cl,5H_2O$, is formed when chlorin gas is dissolved in a small amount of cold water and the temperature of the solution is reduced to or below 0° centigrade, the hydrate being precipitated in the form of tabular crystals. These crystals are stable if maintained at a sufficiently-low temperature, but rapidly decompose with evolution of free chlorin at temperatures much above zero.

In order to chlorinate ores by the use of chlorin hydrate, crystals of this compound may be introduced into the vats or barrels containing the ore. The heat imparted to the crystals by the ore, which is presumably at the average atmospheric temperature and considerably above zero, will cause the crystals to be rapidly decomposed and all of the chlorin to be liberated throughout the body of ore.

Another method of applying the chlorin hydrate is to dissolve the crystals in water at a temperature below that at which the hydrate decomposes and to introduce the cold solution into the vessel containing the ore, the hydrate decomposing as the temperature of the solution rises.

A third mode of application which has some advantages is to produce the chlorin hydrate by introducing chlorin gas into water maintained at a low temperature and in excess of the amount theoretically requisite for the production of the hydrate and as soon as the chlorin has been absorbed to reduce the temperature of the solution to a point where the excess of water will be frozen into a cake of ice containing the chlorin hydrate. This ice, which may be made elsewhere and shipped to the point of use, when introduced into vessels containing ores will quickly melt, and the chlorin will be evolved from the hydrate as before, while the excess of water will serve a useful purpose in converting or assisting to convert the ore into a thin pulp.

Our process of supplying chlorin has several advantages over those in common use, among which are greater convenience and lower cost.

A similar process can be used to brominate ores by introducing bromin hydrate ($Br,5H_2O$) into vessels containing the ore, this hydrate being either in the form of crystals dissolved in a cold aqueous solution or inclosed in a cake of ice.

We claim—

1. The process of treating ores with a halogen, which consists in bringing a halogen hydrate into proximity to the ore and raising the temperature of said hydrate to a point sufficient to cause its decomposition with evolution of the halogen, as set forth.

2. The process of treating ores with a halogen, which consists in bringing crystals of a halogen hydrate into proximity to the ore and raising the temperature of said hydrate to a point sufficient to cause its decomposition with evolution of the halogen, as set forth.

3. The process of treating ores with a halogen, which consists in bringing crystals of a halogen hydrate inclosed in an excess of frozen water into proximity to the ore and raising the temperature to a point sufficient to melt the ice and decompose the hydrate with evolution of the halogen, as set forth.

4. The process of treating ores with chlorin, which consists in bringing chlorin hydrate into proximity to the ore and raising the temperature of said hydrate to a point sufficient to cause its decomposition with evolution of the chlorin, as set forth.

5. The process of treating ores with chlorin, which consists in bringing crystals of chlorin hydrate into proximity to the ore and raising the temperature of said hydrate to a point sufficient to cause its decomposition with evolution of the chlorin, as set forth.

6. The process of treating ores with chlorin, which consists in bringing chlorin hydrate inclosed in an excess of frozen water into proximity to the ore and raising the temperature to a point sufficient to melt the ice and decompose the hydrate with evolution of the chlorin, as set forth.

In testimony whereof we have signed our names to this specification in the presence of two subscribing witnesses.

JOHN D. HAWKINS.
HERBERT W. FOX.

Witnesses:
H. C. MORSE,
LEONARD E. CURTIS.